July 5, 1966 P. L. STAVENGER 3,259,246
HYDROCYCLONES
Filed May 29, 1963 3 Sheets-Sheet 2
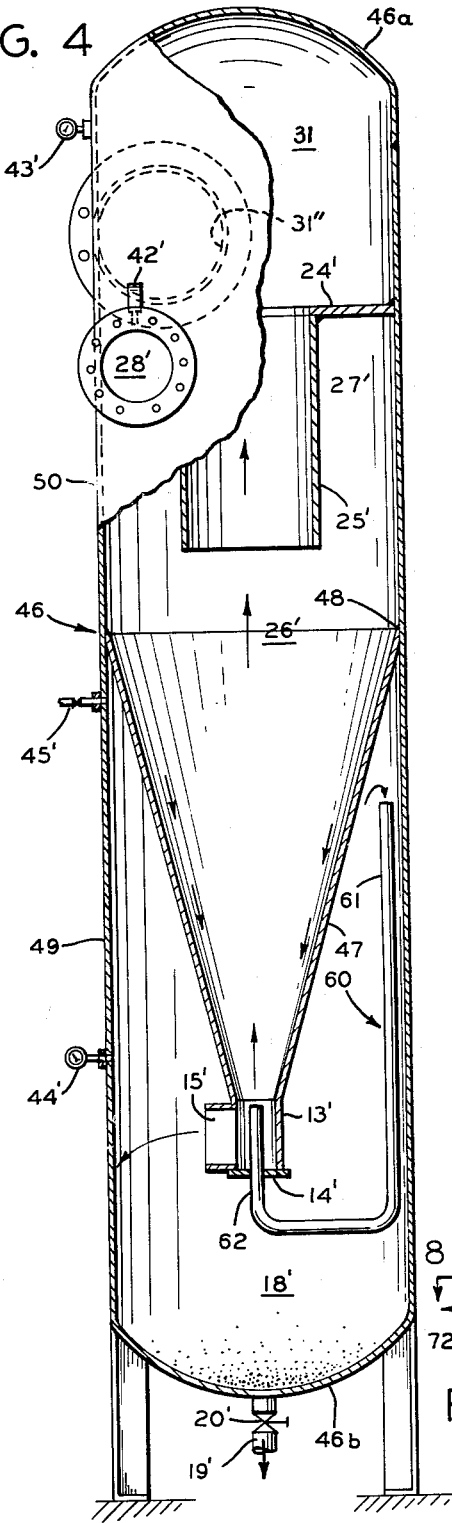
FIG. 4
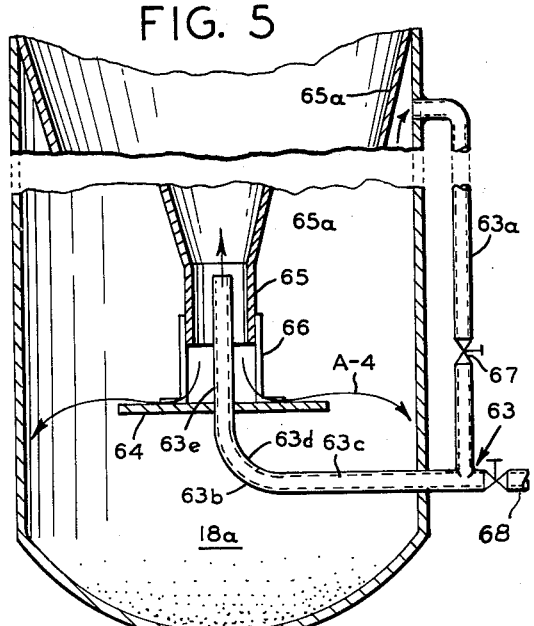
FIG. 5
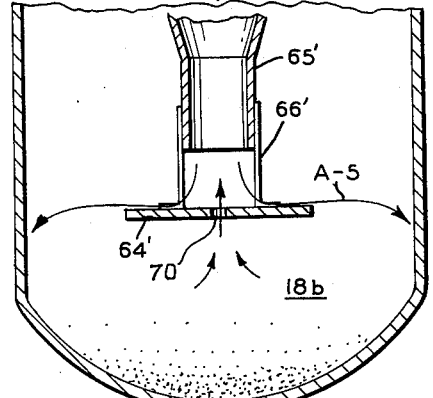
FIG. 6
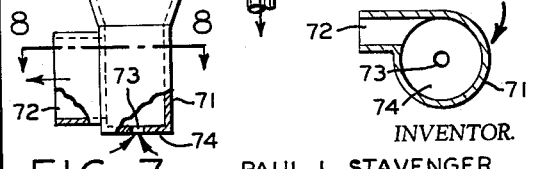
FIG. 7
FIG. 8
INVENTOR.
PAUL L. STAVENGER
BY Theodore M. Jablon
ATTORNEY.

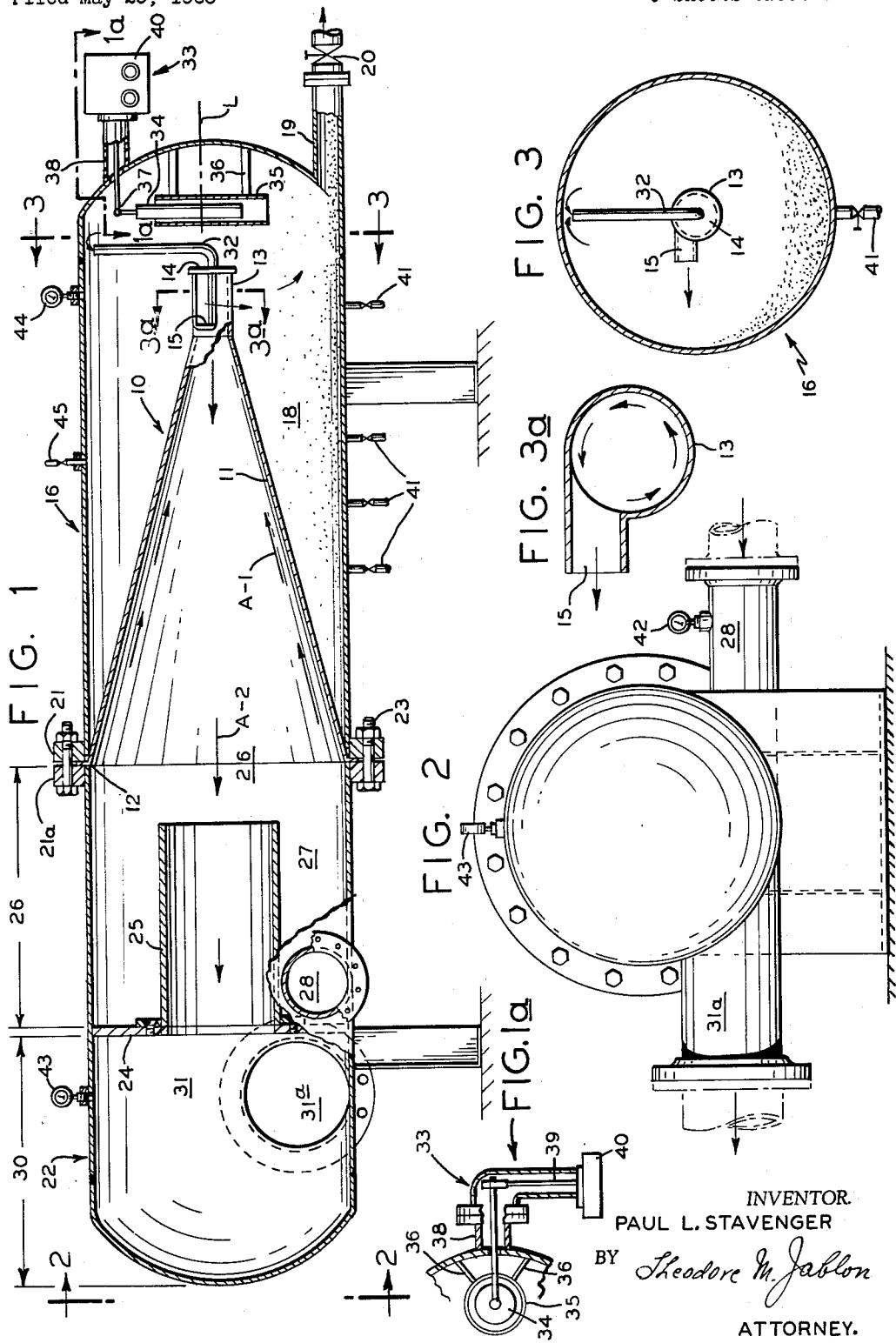

July 5, 1966     P. L. STAVENGER     3,259,246
HYDROCYCLONES
Filed May 29, 1963     3 Sheets-Sheet 3

INVENTOR.
PAUL L. STAVENGER
BY *Theodore M. Jablon*
ATTORNEY.

3,259,246
HYDROCYCLONES

Paul L. Stavenger, Westport, Conn., assignor to Dorr-Oliver Incorporated, Stamford, Conn., a corporation of Delaware
Filed May 29, 1963, Ser. No. 284,072
2 Claims. (Cl. 210—195)

This invention relates to hydrocyclone apparatus applicable, for example, to effect the separation of solids out of liquids.

In such apparatus, liquids containing solids or gritty matter, may be subjected to the action of a free vortex in a conical vortex chamber, maintained by the energy of the pressure head provided at the feed inlet end of the unit. The energy effects the separation of the mixture into an underflow fraction or slurry containing solids and an overflow containing liquid separated from those solids.

More particularly, such an operation may be conducted for the purpose of eliminating substantially all solids from the overflowing liquid, or else to cause fine solids to go with the overflow and coarse solids to discharge by way of underflow in what may be termed a hydrocyclone classification operation.

According to still another mode of hydrocyclone operation herein more particularly illustrating the invention, the feed mixture may contain liquids of different specific gravities as well as grit. Crude oil is an example, requiring the recovery of the oil separated as far as possible from residual water as well as from the gritty matter in the crude.

The invention is concerned more particularly with improvements both in hydrocyclone apparatus and in mode of operation, where the overflow must be discharged against a relatively high pressure rather than into the atmosphere as above described, and where the separated and entrapped underflow material or slurry must at least be periodically removed into the atmosphere from a closed underflow receiving chamber.

An example of such a condition is found where the hydrocyclone unit is required to be capable of discharging degritted and dewatered oil into a high pressure line, and thus against pressures which may be in the order of 1,000 pounds per sq. inch or considerably more. A hydrocyclone unit delivering against pressure shall herein be called a pressurized unit.

Therefore, it is among the objects of this invention to provide a hydrocyclone unit of great structural simplicity and compactness, which is highly resistant to such operating pressures yet relatively easy to fabricate especially with respect to the cone portion of the device, and which can be readily placed on stream or incorporated in high-pressure lines such as pipe lines for the crude.

Another object is to provide an improved pressurized hydrocyclone unit having means for causing the return into the vortex chamber of excess clear liquid effectively separated from the grit in the closed underflow receiving chamber, whereby the presence of tramp solids in the overflow is minimized or eliminated, in that chamber.

Still another object relating particularly to the separating treatment of the crude is to insure that only separated residual oil is displaced back into the vortex chamber while grit-water slurry only is removed into the atmosphere.

Some of the foregoing objects are attainable by providing a hydrocyclone construction wherein the vortex chamber or cone has its wide end connected peripherally to the surrounding wall of an elongate cylindrical pressure container in coaxial relationship therewith, so that one end portion of the container surrounding the cone provides the underflow receiving chamber, while the opposite complementary end portion of the container provides the cylindrical portion or feed chamber for the cone, as well as the overflow receiving chamber, with the container walls thus absorbing the internal pressure of the system, and the cone portion itself pressure-relieved and fabricated readily from relatively thin gauge sheet material. Differently expressed, the cone section of the hydrocyclone is surrounding by a cylindrical underflow receiving chamber coaxial with the cyclone axis, and constitutes together with the cylindrical portion of the hydrocylone itself a cylindrical container.

Other objects are attainable by providing a return conduit means leading from an upper region of clear separated liquid in the closed underflow receiving chamber downwardly and then into the apex end of the cone for delivering return excess liquid into the vortex chamber axially directed towards the vortex finder, thereby insuring the return of clear excess liquid back into the chamber, and also by providing means for diverting the underflow laterally or tangentially away from the cyclone axis in a manner to avoid swirling in the underflow receiving chamber and to encourage settling. This also avoids remixing of underflow solids with liquid returning into the apex end of the cone.

Specific features of the invention lie in structural details of the cylindrical pressure container especially in relation to the arrangement of the cone, allowing the pressure-relieved cone to be fabricated from thin gauge sheet material.

Other features lie in the various arrangements of means for conducting the return of excess clear liquid from the underflow receiving chamber back into the vortex chamber.

Further features lie in the provision of means for diverting the underflow material laterally away from the cyclone axis and away from the path of the excess liquid seeking to return into the vortex chamber, preferably in conjunction with conduit means for facilitating such return.

Still other features are found in the method and means for controlling the level of a liquid-liquid interface in the closed underflow receiving chamber, for example when crude oil is subjected to hydrocyclone treatment in order that grit as well as residual water may be separated from the oil.

Other features and advantages will hereinafter appear.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperatively equivalents, are therefore intended to be embraced by those claims.

The invention itself, however, both as to its construction and its method of operation, together with additional objects and advantages thereof, will be best understood from the following description of specific embodiments when read in connection with the accompanying drawings, in which:

FIG. 1 illustrates one embodiment of the invention featuring the cylindrical container shape horizontally disposed, and means for underflow discharge and liquid return through the apex portion of the cone;

FIG. 1a is a detail plan view taken on line 1a—1a of a liquid-liquid interface responsive device shown in the embodiment of FIG. 1;

FIG. 2 is an end view of the apparatus, taken on line 2—2 of FIG. 1;

FIG. 3 is a cross-sectional view taken on line 3—3 of FIG. 1, illustrating the relationship between the tangential apex opening and the conduit means for liquid return;

FIG. 3a is a detail cross-section of the apex portion of the cone, taken on line 3a—3a of FIG. 1;

FIG. 4 shows the vertical arrangement of the cyclone unit of FIG. 1, including modifications;

FIG. 5 is a fragmentary view of the lower end portion of the hydrocyclone unit of FIG. 4, showing another embodiment of the means for underflow discharge and liquid return;

FIG. 6 is a fragmentary view similar to FIG. 5, showing a further embodiment of the means for underflow discharge and liquid return;

FIG. 7 is a fragmentary detail side view of the apex portion of the cone, showing still another embodiment of the means for underflow discharge and liquid return;

FIG. 8 is a cross-section taken on line 8—8 in FIG. 7;

Figure 9:
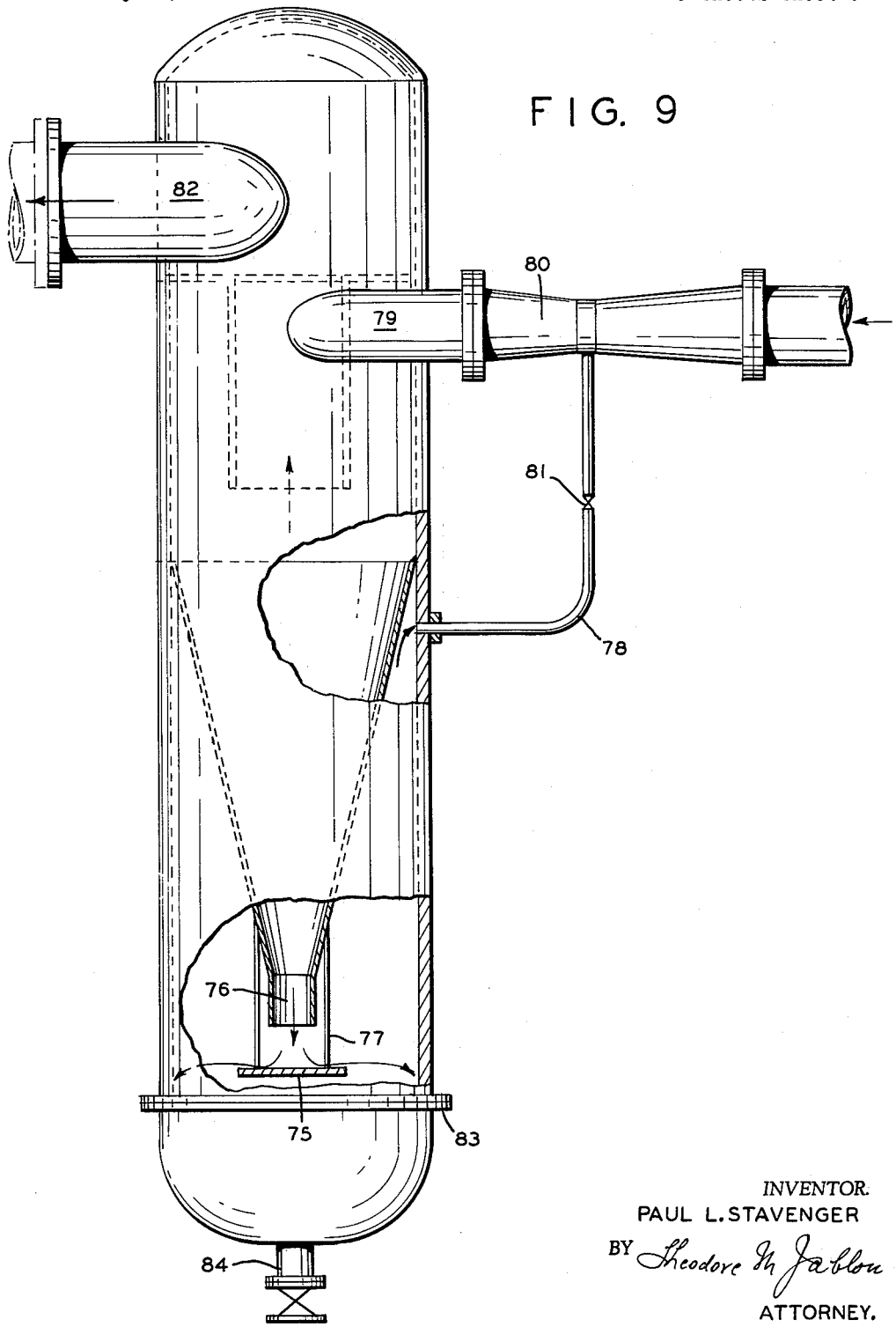
FIG. 9 is a side view of the apparatus substantially as shown in FIG. 4, with parts of the container wall broken away, embodying an arrangement for liquid return other than through the apex portion of the cone.

As exemplified in the embodiment of FIG. 1, a hydrocyclone unit embodying the invention is shown with its axis horizontally disposed. In this embodiment the unit comprises a vortex member 10 of substantially conical configuration and herein also briefly called the cone, consisting of a trunco-conical body portion 11 the wide end of which has a flange 12, while the constricted or apex end terminates in a cylindrical neck portion 13 closed by an end plate 14 and formed with a laterally directed tangentially disposed discharge mouth or spout 15.

The conical vortex member is surrounded coaxially by a cylindrical container member 16 having a closed dome-shaped end, providing an underflow receiving chamber 18 around the vortex member for receiving separated underflow material discharging from the spout 15. This chamber is preferably designed for pressure operation, and therefore, the closed end thereof is provided with a discharge connection 19 having a discharge valve 20 operable for withdrawing or releasing separated underflow material or slurry into the atmosphere.

The container member 16 has a flange 21 connected to a companion flange 21a of a complementary cylindrical container member 22, with the flange 12 of the vortex member tightly confined and held between the flanges of the container members as indicated by connecting bolts 23. Both container members being complementary to each other and of preferably equal diameter and of the same wall thickness, and each having a domed end, are capable of withstanding the contemplated pressure operation of the unit.

The container member 22 has an intermediate transverse annular wall 24 having connected thereto the tubular passage member or vortex finder 25 coaxial with the conical vortex member. Facing inwardly, this transverse wall together with the cylindrical portion 26 of container member 22 and with the conical vortex member, constitutes the vortex chamber 26 including the annular feed inlet zone 27 which surrounds the vortex finder and which is supplied by a tangentially disposed feed inlet neck 28. Facing outwardly, the transverse wall forms with the end portion 30 of container member 22 the overflow receiving chamber 31 communicating through the vortex finder with the vortex chamber 26, and having a tangentially directed outlet neck 31a for discharging separated overflow.

In order to allow for the return of excess liquid from the receiving chamber 18 preferably into the vortex chamber 26, there are provided return passage means, for example, an open-ended conduit means or pipe 32 shaped so as to extend from the upper region of the receiving chamber first downwardly and then horizontally through end plate 14 and axially a distance into the terminal cylindrical neck portion 13 of the cone. In this way, as separated solids or gritty matter projected laterally and tangentially from the apex portion of the cone, settle and collect on the bottom of receiving chamber 18, clear liquid from the upper region thereof is displaced through the pipe axially into the apex of the cone and thus into the core of the swirling mass or free vortex maintained in the vortex chamber, to make its way to the overflow outlet means along with the separated liquid.

The hydrocyclone unit in this example is shown to be equipped with a float-controlled device 33 responsive to variations in the level of the interface between two liquid bodies having different specific gravities, such as oil and water. Such a device may be employed for maintaining the interface between upper and lower limits, or substantially at a suitable predetermined level.

Thus for example, when crude oil containing water as well as solids or gritty matter is treated in this hydrocyclone unit for separating the oil from both the water and from the grit, the interface can be maintained for example at a desired level "L," so that only oil substantially free of the solids and of water is allowed to escape through the return pipe 32, while separated water and solids collect in the body subjacent to the oil in the receiving chamber. Whenever the float device registers an undue rise of the interface, a suitable amount of slurry, that is water mixed with solids, may be withdrawn by operating the discharge valve 20 so as to bring the interface level back to normal.

Such a correction may be effected automatically by suitable relay devices operatively interconnecting the float controlled device and the underflow discharge valve 20 in a suitable manner here not particularly shown. The device 33 itself as schematically shown may be the kind illustrated in the Fisher Governor Company's Bulletin F-4B, FIG. 34, Type 2500-249V.

As indicated in FIGS. 1 and 1a, the control device is governed by a cylindrical vertical float member 34 operating loosely in an open-ended vertical cylinder 35 held fixed by bracket members 36 within the underflow receiving chamber. The upper end of the vertical float member has pivotal connection 37 with a torque arm 38 attached to torque rod 39 whereby even small changes of the interface level acting upon the float member will register through suitable mechanism contained in box 40 of the device and actuated by the torque rod 39. Suitable electrical or pneumatic relay transmitting means for example, may be employed to actuate the discharge valve accordingly, to eliminate the slurry from the system whenever necessary.

A number of valved water supply connections 41 are provided at the bottom of the underflow receiving chamber, whereby flush water may be admitted to facilitate withdrawal of the solids or whereby make-up water can be supplied when the water level, that is the interface level, drops too low, or when insufficient water is available in the oil, in order that the escape of oil along with solids discharge may be obviated.

Pressure gauges 42 and 43 are provided for indicating the pressures at the inlet end and the outlet end respectively of the cyclone unit, the pressure difference between feed suspension and separated liquid representing the energy required for maintaining the free vortex in the cyclone operation. Another pressure gauge 44 indicates pressure in the underflow receiving chamber. A vent connection 45 is shown at the top end of the underflow receiving chamber, adapted to be closed and opened by a valve in order to release gas or air which may have been trapped.

For example, if the hydrocyclone unit be employed for the purpose of dewatering and degritting crude oil or the like, it may be necessary to discharge the separated oil against a pipe line pressure in the order of 1,000 lbs. per square inch and possibly much higher. Accordingly, the crude oil is pumped into the vortex chamber at a still higher pressure at least sufficient to provide the extra energy required for maintaining the cyclone operation. The cylindrical container shape featured by this invention and representing the outer contour of the hydrocyclone unit, can be readily built to withstand these pressures. However, the conical vortex member therein is stress-relieved and may in turn be fabricated at low cost and light weight for example from relatively thin gauge sheet metal plate, or from other suitable material.

In the operation of the cyclone unit shown in FIG. 1, assuming that crude oil is to be dewatered and degritted, the crude is pumped at the required high pressure into the vortex chamber of the unit for maintaining therein the free vortex which separates the water and the solids migrating along the conical wall towards the apex discharge in the general direction of the arrows A–1, whereas the separated oil being displaced continuously into the core of the vortex is forced to move in an opposite direction and through the vortex finder and the overflow receiving chamber and eventually out against the pressure of the oil pipe line to which the unit is connected.

Water and solids are continuously ejected laterally and tangentially from the spout 15, preferably in the horizontal direction indicated in FIGS. 3 and 3a, minimizing any agitating effects upon the solids tending to gravitate and collect at the bottom of the chamber, and to provide a clear liquid zone at the top from which clear oil may enter the return pipe 32. Meanwhile, the interface level is maintained within suitable upper and lower limits, preferably with the aid of a control device which may be of the kind above exemplified.

The pressurized hydrocyclone unit of this invention readily lends itself to being operatively connected to an oil line pressure system.

Referring now to the embodiments in FIGS. 4 to 8, the hydrocyclone has its axis vertically disposed, while further differentiating from the FIG. 1 example with respect to the construction of the pressurized container structure and also in regard to different arrangements of the passage means whereby excess liquid or oil is returnable into the vortex chamber.

Accordingly, we find that the vertical container structure comprises a full length cylindrical shell 46 closed by domed ends 46a and 46b preferably welded to the shell. Within this shell and coaxial therewith is located a conically shaped vortex member 47 the wide end of which is peripherally joined or welded as at 48 to the surrounding cylindrical shell, this joint being suitably spaced from both ends of the container and defining complementary sections 49 and 50 of the container structure. Otherwise, this conical member is substantially similar to the one illustrated in FIG. 1, including a constricted end portion formed with a cylindrical discharge neck 13′, the end plate 14′, and the laterally directed tangential discharge spout 15′.

The section 49 of the container structure thus provides the underflow receiving chamber 18′. The complementary container section 50 provides the cylindrical part of the hydrocyclone proper, with the vortex finder 25′ and the annular partition wall 24′ defining the vortex chamber 26′ and the overflow receiving chamber 31′ against each other. Again there is an inlet neck 28′ and an outlet neck 31′, respectively for admitting feed suspension under pressure and for discharging separated liquid against a corresponding delivery pressure. Also there are again the various pressure gauges 42′, 43′, and 44′, as well as a valved vent connection 45′, and a make-up or fresh water connection 41′.

A liquid return pipe 60 leading into the apex of the vortex chamber is of generally U-shaped configuration with a long vertical shank 61 reaching into the upper clear liquid region of the underflow receiving chamber, and a considerably shorter vertical shank 62 extending through the end plate 14′ a distance into the discharge neck 13′. Thus it is seen that the underflow receiving chamber is compactly arranged around the cone, providing not only a container of highly pressure resistant characteristics, but also presenting near the wide end portion of the cone a high take-off point for the liquid to be returned preferably from a clear liquid zone.

Again, if crude oil be undergoing separation, the oil-water interface will be maintained at a suitable elevation, not higher than a short distance below the liquid take-off point or top end of the long shank of return pipe 60.

In FIG. 5, a fragmentary view showing the lower portion of the vertical unit, a liquid return conduit means in the form of a pipe arrangement 63 leads into the constricted portion of the vortex chamber, but is partially exposed outside the underflow receiving chamber and thus outside the pressurized container structure.

Accordingly, the pipe arrangement 63 comprises an upright pipe section 63a communicating at its upper end through the container wall with the upper region of the underflow receiving chamber, and at its lower end communicating with a pipe section 63b which has a horizontal portion 63c, a bend 63d and an upwardly directed short terminal leg 63e. In this embodiment, the short leg 63e extends upwardly through a baffle plate 64 of the like spaced from the open end of a cylindrical terminal discharge neck 65 at the constricted end of cone 65a, which baffle is held by bracket members 66. The upright pipe section 63a has a valve 67 therein operable to control the amount of liquid passing through this pipe. The pipe arrangement 63 also has a flush water connection 68 operable, for instance with valve 67 closed, to flush out the pipe section 63b. It will be understood that a return pipe arrangement substantially as shown in FIG. 5 is applicable also in other embodiments, for instance those in FIGS. 1 and 4.

In FIG. 5 the ejection of the underflow material from the apex is directed downwardly against the transverse baffle 64 deflecting the material radially substantially in all directions as indicated by the arrow A–4.

FIG. 6 is another fragmentary view differentiated from FIG. 5 with respect to the passage means for returning the liquid from the underflow receiving chamber axially back into the cone. In this embodiment, while underflow material again is diverted radially in all directions by a baffle member 64′, provision is made for allowing liquid from the receiving chamber 18b to return axially into the vortex chamber via a centrally disposed passage provided in the baffle member. While shown simply as a hole 70, this passage may include a straight length of tube extending from the central baffle hole a distance into the discharge neck 65′. Furthermore, whereas the baffle member is shown to extend transversely, that is at right angles to the cyclone axis with consequent radial underflow discharge therefrom in all directions indicated by arrows A–5, it will be seen that with the baffle or similar member somewhat tilted against the horizontal a greater quantity of underflow material may be caused to discharge in one direction than in the other, depending upon the extent of such a tilt which may be adjustable.

Another apex discharge arrangement is shown in the embodiment of FIGS. 7 and 8, in that the terminal discharge neck 71 of the cone has a laterally directed tangential discharge spout 72 and a centrally disposed liquid return passage or opening 73 provided in the end plate 74 of the neck. While this construction has been illustrated in conjunction with the unit that is vertically disposed, it is applicable to those that are non-vertically disposed.

In FIG. 9, a vertically disposed hydrocyclone resembles the apparatus shown in FIGS. 4, 5 and 6. More particularly the construction of the apex discharge means, as in FIGS. 5 and 6, has a baffle member 75 spaced from the end of apex discharge neck 76 by means of brackets 77, which baffle is shown to extend transversely of the cyclone axis. However, there is a difference in that the liquid return passage is not through the center of the baffle member or axially into the constricted end of the vortex chamber, but is effected through external means providing flow transfer communication between the upper region of the underflow receiving chamber and the supply of feed suspension into the unit. Accordingly, in one example, a conduit 78 provides return flow from the receiving chamber to the constricted or low pressure point of a Venturi-shaped flow section or Venturi device 80 located in the flow path of the feed suspension entering the inlet neck 79 leading into the vortex chamber.

The aspirating effect of the Venturi device overcomes the pressure differential between the liquid in the underflow receiving chamber and the feed suspension being pumped into the unit at the requisite operating pressure, thus providing one-way flow communication. Moreover, the return conduit 78 has a valve 81 operable to control the quantity of liquid thus returning, for retreatment into the vortex chamber.

In case of the aforementioned crude oil separation, it will be seen that in the various embodiments of the invention, the level of the interface should be maintained a suitable or safe distance below the take-off point that is below the level at which clear liquid or oil enters the return conduit or the like. Thus, in the arrangements of FIGS. 6 and 7, the interface should be respectively below the baffle plate 64' and below the end plate 74, whereas in FIGS. 1, 4, 5 the interface level need only be safely below the respective high points of the return conduit means to prevent recirculation of separated water and of solids, but not so low as to allow the escape of oil when separated solids are withdrawn from the receiving chamber. In general, however, the arrangement preferably is such that return liquid derives from a clear liquid region in the underflow receiving chamber, spaced from the solids collection zone therein.

When efficient solids separation is achievable for instance in the receiving chamber, liquid may be allowed to return from the clear liquid region therein into the separated liquid coming from the vortex finder.

Furthermore, where the apex discharge means of the cone are, for example, similar to the embodiment in FIG. 6, a set of directional blades or vanes may be provided substantially in the space between the neck 65' and the baffle 64' so that their faces are substantially parallel to the cyclone axis to absorb swirl of the apex discharge means and to allow the solids to gravitate to the bottom of the receiving chamber. These vanes may terminate short of the wall of the receiving chamber, or they may have their ends connected to the wall of the chamber thus stablizing the cone construction. The vanes may extend substantially radially or they may be curved.

From the foregoing it will be seen that the invention provides an improved hydrocyclone unit of great compactness, simple to manufacture, and readily applicable to pressure operation, including special features relative to solids separation in, and solids removal from the underflow receiving chamber, as well as to means for the return of liquid from that chamber.

It will be understood that each of the elements described above, or two or more together, may also find a useful application in other types of hydrocyclone apparatus differing from the types described above.

Furthermore, while the invention has been illustrated in a hydrocyclone unit for separating solids from a suspension against a relatively high delivery pressure, it is not intended to be limited to the details shown, since various modifications and structural as well as operational changes may be made without departing from the spirit of this invention.

Without further analysis, the foregoing will so fully reveal the gist of the present invention that others can by applying current knowledge readily adapt it for various applications without omitting features that, from the standpoint of prior art, fairly consitute essential characteristics of the generic or specific aspects of this invention and, therefore, such adaptations should and are to be intended to be comprehended within the meaning and range of equivalence of the following claims.

I claim:

1. A pressure pipe line hydrocyclone for separating heavier materials from liquid capable of operating at line pressures of approximately 100 pounds per square inch or more, comprising in combination, a closed cylindrical pressure vessel having dome-shaped ends and a wall thickness designed to withstand said pressures, a conical hollow vortex member of substantially greater length than maximum diameter having a constricted underflow discharge apex end arranged coaxially of and wholly within said pressure vessel whereby the line pressures on either side of said vortex member are substantially equalized, said vortex member being spaced from the ends of the vessel with the periphery of its wide end engaging the vessel and dividing the same into a feed receiving and vortex forming chamber and into an underflow receiving chamber, a tubular vortex finder extending axially in said feed receiving and vortex chamber toward the wide end of said conical member forming an annnular zone between said finder and the wall of the chamber and operating to discharge the overflow fraction therethrough from said feed receiving and vortex chamber, a tangential inlet means constructed for connection to a pipeline for introducing the feed mixture under line pressure into the annular zone surrounding said vortex finder, with said underflow fraction being delivered through said constricted end into said underflow receiving chamber, and said overflow passing out through said vortex finder, underflow outlet means for discharging underflow material contained under pressure in said underflow receiving chamber, and overflow outlet means constructed for connection to the pipeline in communication with said vortex finder for discharging said overflow against line pressure, said conical vortex forming means having at its open end a lateral outlet and a transverse member beyond said lateral outlet preventing axial flow of said underflow discharged into said underflow receiving chamber, said lateral outlet and member being spaced sufficiently above the lowermost portion of the underflow receiving chamber to provide settling space therein below the lateral outlet, for the underflow, said member having an axially positioned liquid return opening therein, and a liquid return duct having an inlet end in said receiving chamber above and functionally remote from said lateral outlet, said duct having its other end connected to said return opening.

2. The invention according to claim 1 including a structure supporting the pressure vessel on its side with its longitudinal axis substantially horizontal, a transverse partition in said feed receiving and vortex forming chamber surrounding and supporting said vortex finder and having a peripheral portion secured to the interior of said vessel between the end thereof and the vortex forming member to form an overflow discharge chamber separate from said annular zone and tangential feed inlet, said duct having its inlet end above the longitudinal axis of the vessel.

(References on following page)

References Cited by the Examiner

UNITED STATES PATENTS

| | | | |
|---|---|---|---|
| 381,639 | 4/1888 | Pomeroy | 55—459 X |
| 768,808 | 9/1904 | Venderbush et al. | 55—459 |
| 2,153,026 | 4/1939 | Ringius | 55—459 |
| 2,494,465 | 1/1950 | Watson et al. | 209—144 |
| 2,638,218 | 5/1953 | Simpson et al. | 209—144 |
| 2,638,219 | 5/1953 | Gordon et al. | 209—144 |
| 2,672,215 | 3/1954 | Schmid. | |
| 2,681,124 | 6/1954 | Van Der Kolk. | |
| 2,717,695 | 9/1955 | Martin | 209—211 |
| 2,726,767 | 12/1955 | Rakowsky | 210—512 X |
| 2,754,968 | 7/1956 | Vegter et al. | |
| 2,812,828 | 11/1957 | Yellott et al. | |
| 2,906,404 | 9/1959 | Orelli et al. | 210—512 |
| 2,937,713 | 5/1960 | Stephenson et al. | 55—391 X |
| 3,034,647 | 5/1962 | Giesse | 210—512 X |
| 3,134,734 | 5/1964 | Krebs | 55—454 X |
| 3,151,961 | 10/1964 | Blackmore et al. | 210—512 X |
| 3,204,772 | 9/1965 | Ruxton | 210—512 |

FOREIGN PATENTS 73,537   5/1948   Norway.

REUBEN FRIEDMAN, *Primary Examiner.*

D. M. RIESS, *Assistant Examiner.*